United States Patent [19]

Brunet

[11] Patent Number: 4,526,302

[45] Date of Patent: Jul. 2, 1985

[54] ADAPTER DEVICE FOR SPRAYING THE CONTENT OF A SECTILE AMPULE

[75] Inventor: Michel Brunet, Sainte Colombe la Commanderie, France

[73] Assignee: Sandoz Ltd., Basel, Switzerland

[21] Appl. No.: 616,272

[22] Filed: Jun. 1, 1984

Related U.S. Application Data

[63] Continuation of Ser. No. 368,472, Apr. 14, 1982, abandoned.

[30] Foreign Application Priority Data

Apr. 30, 1981 [FR] France ................................ 81 08673

[51] Int. Cl.$^{3}$ .............................................. G01F 11/06

[52] U.S. Cl. .................................... 222/321; 222/325; 239/333

[58] Field of Search ................ 141/114; 222/321, 382, 222/381, 325-327, 372, 180-183, 5, 83; 239/333

[56] References Cited

U.S. PATENT DOCUMENTS

| | | | |
|---|---|---|---|
| 2,323,865 | 7/1943 | Barnes | 222/183 |
| 4,122,982 | 10/1978 | Giuffredi | 222/321 |
| 4,275,774 | 6/1981 | Andersen et al. | 222/325 |

*Primary Examiner*—H. Grant Skaggs
*Attorney, Agent, or Firm*—Gerald D. Sharkin; Robert S. Honor; Walter F. Jewell

[57] ABSTRACT

So as to use easily in atomizing the content of a sectile ampule, the invention provides a unitary device comprising a tubular element fitted at one end with a hand actuated spraying pump, the other end of the tubular element being open for forming a tubular housing designed for receiving the sectile ampule.

4 Claims, 1 Drawing Figure

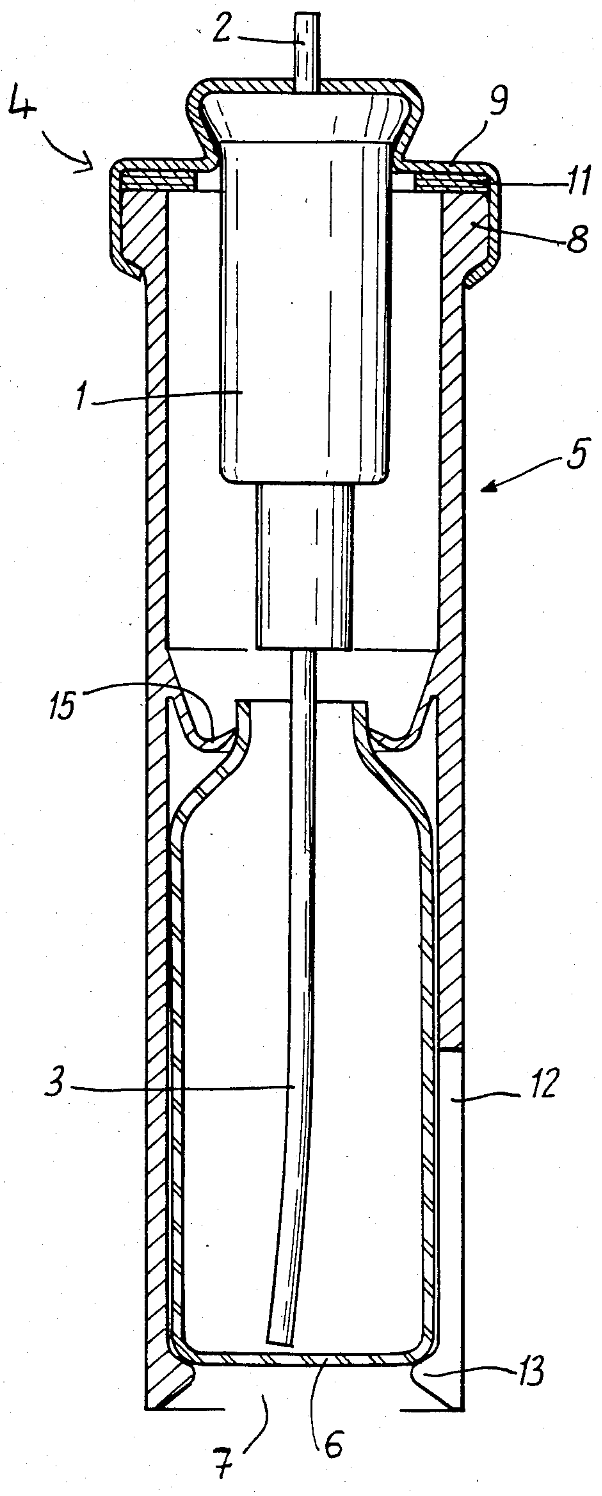
2
4
9
11
8
1
5
15
3
12
13
7
6

ADAPTER DEVICE FOR SPRAYING THE CONTENT OF A SECTILE AMPULE

This is a continuation of application Ser. No. 368,472, filed Apr. 14, 1982, now abandoned.

The present invention relates to an adapter device for a sectile ampule.

For various applications, in medicine, health, perfumery, liquid substances are frequently dispensed in spray form, for example on the skin, in the throat, ears, etc. The substance to be sprayed is generally provided in a container fitted with a spray device, which may be operated by means of a gas pressure, whether the gas is solved in the liquid substance or not, by means of a hand (finger) actuated pump.

The substance to be sprayed may remain during a rather long period of time in contact with the various parts of the dispensing device: plastic parts, rubber gaskets, etc, which may at length be soluble in the substance. Air may happen to flow in the container, the product may happen to leak and it can be polluted or otherwise damaged.

Some drugs or other health and perfumery agents or substances are sold in sealed glass ampules (sectile) designed for being open (broken) at the time the substance is to be used. The substance is thus kept and stored in quite perfect conditions. But a careful handling is necessary for passing the substance from the ampule into the spraying dispenser. The present invention has for its object a device allowing to combine the advantages of conditioning the substance when sold in a sectile ampule, and when sold directly in a spraying dispenser.

It is known already by French Pat. No. 2,168,265 to Bouvaist, a device for fixing a spraying pump on the neck of a container, including a connecting part having a grip both on the pump body and on the container. First, such a device cannot be used with an ampule. Further, for holding together the pump, the container and the connecting part, the assembly must be housed in a box.

The present invention has for its object a simple device, comprising only one part, ready to receive a glass ampule, without any other handling than opening the ampule, an end of which is to be broken, and allowing an easy and safe implementation, for having a compact appearance, in view of the sale in a drugstore.

The invention has also for its object to provide a cheap device since this device is disposable, being designed for being discarded after use.

According to the present invention, an adapter device for dispensing the content of a sectile ampule in a spray form comprising a hand actuated spraying pump comprises a unitary device including an element of generally tubular shape, an end of which element is fitted with said hand actuated spraying pump with a dip tube (suction tube) extending inside said tubular element substantially along its whole length, the other end of said tubular element being open for forming a tubular housing designed for receiving said sectile ampule, said tubular element including further means for providing a sealed connection with the ampule aperture, and means for keeping the ampule in its housing.

Various other objects, features and attendant advantages of the present invention will be more fully appreciated as the same becomes better understood from the following detailed description of the present invention when considered in connection with the accompanying drawing, the one FIGURE of which is a schematic axial section view of an embodiment of the present invention.

The device includes a hand (finger) actuated spraying pump 1, the inside of which is not shown since it is conventional. A valve stem 2 is the actuation member of the pump. It normally receives a push button, not shown, fitted with a spraying nozzle. The pump includes an inside return spring biasing stem 2 outwardly. On the suction side of the pump, there is provided a suction, or dip tube 3. In this embodiment, the device comprises a tubular element 5. Pump 1 is fixed at a first end 4 of said tubular element 5. For this purpose, tubular element 5 is fitted at said end 4 with an outer bead 8 allowing to fix pump 1 by means of ferrule 9 with a sealing gasket 11. The other end 7 is open for forming a tubular housing designed for receiving the sectile ampule, once an end of said ampule has been broken. The shape of tube 5 allows for a simple, easy and effective fixing of said ampule. Once introduced in the ampule, tube 3 extends substantially unto the bottom of ampule 6, since said tube 3 is normally extending unto a position adjacent to the open end of tubular element 5.

For allowing the introduction of ampule 6 and its keeping in position, tubular element 5 is formed at its open end 7, opposite end 4 fitted with the pump, at least with one split 12, and with an inwardly disposed bead 13. Said bead provides for the holding in place of ampule 6 in tubular element 5. Split 12 allows the widening of the tubular element when the ampule is passing the neck formed by bead 13.

A sealing bead, for example in form of a lip 15 of annular shape, is provided on the inner wall of tubular element 5. It has a double purpose: ensure tightness and determining the position of ampule 6, in cooperation with bead 13. It allows further for a certain accomodation to different lengths of ampules.

Preferably, the ampule and the device of the present invention are sold in one box. The user breaks the sectile ampule and inserts it in the tubular element. When these two parts are assembled, the assembly may be used like a hand actuated atomizer, and the substance is profitably used. The device can be placed in a reverse position without damage (the substance can be expelled only if the free end of dip tube 3 is dipping into the liquid).

Preferably, the tubular element 5, with lip 15 and bead 13, is formed by a plastic moulded piece, although evidently it may be otherwise designed.

Although one preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. An adapter device for spraying the content of a sectile ampule comprising an element of generally tubular shape, sealingly and fixedly fitted at one end with a hand actuated spraying pump, the pump having an outer hollow actuation valve stem and a suction tube extending inside the tubular element substantially along its whole length, the other end of the tubular element being open for forming a tubular housing designed for receiving the sectile ampule, the tubular element including integral one piece molded therewith an annular lip extending from the tubular element's inner wall for providing a sealed connection with an ampule aperture, and a bead formed on the inner wall of the tubular element adjacent to its open end for maintaining the ampule in its housing and cooperating with the lip to properly position the ampule in the tubular member; the periphery of the open end of the tubular member being capable to be extended resiliently.

2. A device according to claim 1 wherein the tubular element together with its annular lip for a sealed connection for the ampule aperture, and the bead for maintaining the ampule in its housing are formed as one plastic moulded piece.

3. A device according to claim 1, wherein the open end of said tubular element is provided with at least one split.

4. A device according to claim 1 wherein the annular lip for providing a sealed connection with an ampule aperture comprise a circular lip form bead on the inner wall of said tubular element.

* * * * *